(12) United States Patent
Fok et al.

(10) Patent No.: US 11,645,536 B2
(45) Date of Patent: May 9, 2023

(54) PARALLEL RESIDUAL NEURAL NETWORK ARCHITECTURE AND SYSTEM AND METHOD FOR TRAINING A RESIDUAL NEURAL NETWORK

(71) Applicants: Wai Kit Ricky Fok, Toronto (CA); Aijun An, Maple (CA); Xiaogang Wang, Toronto (CA)

(72) Inventors: Wai Kit Ricky Fok, Toronto (CA); Aijun An, Maple (CA); Xiaogang Wang, Toronto (CA)

( * ) Notice: Subject to any disclaimer, the term of this patent is extended or adjusted under 35 U.S.C. 154(b) by 1144 days.

(21) Appl. No.: 16/253,496

(22) Filed: Jan. 22, 2019

(65) Prior Publication Data

US 2019/0236454 A1 Aug. 1, 2019

Related U.S. Application Data

(60) Provisional application No. 62/622,183, filed on Jan. 26, 2018.

(51) Int. Cl.
  *G06N 3/08* (2006.01)
  *G06N 3/084* (2023.01)
  *G06F 17/13* (2006.01)
  *G06F 17/16* (2006.01)

(52) U.S. Cl.
  CPC ............ *G06N 3/084* (2013.01); *G06F 17/13* (2013.01); *G06F 17/16* (2013.01)

(58) Field of Classification Search
  CPC combination set(s) only.
  See application file for complete search history.

(56) References Cited

U.S. PATENT DOCUMENTS

| | | | |
|---|---|---|---|
| 2012/0317058 A1* | 12/2012 | Abhulimen | G06N 20/00 706/2 |
| 2016/0283842 A1* | 9/2016 | Pescianschi | G06N 3/063 |
| 2018/0082179 A1* | 3/2018 | Gredilla | G06N 3/08 |
| 2018/0190268 A1* | 7/2018 | Lee | G10L 15/02 |
| 2018/0225550 A1* | 8/2018 | Jacobsen | G06K 9/6256 |
| 2018/0293711 A1* | 10/2018 | Vogels | G06K 9/6256 |
| 2019/0012593 A1* | 1/2019 | Obradovic | G06N 3/063 |

(Continued)

OTHER PUBLICATIONS

K. Simonyan and A. Zisserman. Very deep convolutional networks for large-scale image recognition. ICLR, Apr. 10, 2015.

(Continued)

*Primary Examiner* — Cindy Trandai
(74) *Attorney, Agent, or Firm* — Bhole IP Law; Anil Bhole; Marc Lampert (57) ABSTRACT

Systems and methods for training a residual neural network are described. One of the methods includes: initializing one or more weights of each of a plurality of residual units; inputting a plurality of training cases to a first warp unit in a series; using each training case to optimize the one or more weights for each residual unit in parallel in the first warp unit in the series; starting with the output of the first warp unit in the series, iteratively propagating the output of each warp unit to the input of a next respective warp unit in the series, for each respective warp unit, using each training case to optimize the one or more weights for each residual unit in parallel in the respective warp unit; and storing the output of the last warp unit in the series and the weights for each residual unit.

20 Claims, 10 Drawing Sheets

(56) References Cited

U.S. PATENT DOCUMENTS

| | | | |
|---|---|---|---|
| 2019/0147329 A1* | 5/2019 | Hekmatshoartabari | ............... G06N 3/0635 706/26 |
| 2019/0147342 A1* | 5/2019 | Goulding | ............... G06N 3/084 706/25 |
| 2019/0180174 A1* | 6/2019 | Koswatta | ............... H03K 19/20 |
| 2019/0230913 A1* | 8/2019 | Chen | ............... G06N 3/08 |
| 2019/0236445 A1* | 8/2019 | Das | ............... G06N 3/0635 |
| 2021/0295166 A1* | 9/2021 | Rouhani | ............... G06N 3/0454 |

OTHER PUBLICATIONS

C. Szegedy et al. Going deeper with convolutions. CVPR, 2015.

S. Ioffe and C. Szegedy. Batch normalization: Accelerating deep network training by reducing internal covariate shift. Proceedings of the 32nd International Conference on Machine Learning (ICML-15), pp. 448-456, Mar. 2, 2015.

R. K. Srivastava, K. Greff, and J. Schmidhuber. Highway networks. https://arxiv.org/abs/1512.03385. Presented at the Deep Learning Workshop, International Conference on Machine Learning, Lille, France, 2015.

K. He, X. Zhang, S. Ren, and J. Sun. Deep residual learning for image recognition. CoRR, Dec. 10, 2015. https://arxiv.org/abs/1512.03385.

G. Huang et al. Deep networks with stochastic depth. CoRR, Jul. 28, 2016. https://arXiv.org/abs/1603.09382.

A. Veit, Wilber M., and S. Belongie. Residual networks behave like ensembles of relatively shallow networks. Oct. 27, 2016. https://arXiv.org/abs/1605.06431.

S. Zagoruyko and N. Komodakis. Wide residual networks. 2016. https://arXiv.org/abs/1605.07146.

D. Han, J. Kim, and J. Kim. Deep pyramidal residual networks. 2016. https://arXiv.org/abs/1610.02915.

P. Chrabaszcz et al. A downsampled variant of imagenet as an alternative to the cifar datasets. Aug. 23, 2017. https://arxiv.org/abs/1707.08819.

A. Krizhevsky, I. Sutskever, and G. Hinton. Imagenet classification with deep convolutional neural networks. NIPS, 2012.

R. Hahnloser et al. Digital selection and analogue amplification coexist in a cortex-inspired silicon circuit. Nature, 405:947-951, Jun. 22, 2000.

N. Srivastava et al. Dropout: a simple way to prevent neural networks from overfitting. Journal of Machine Learning Research, 15(1):1929-1958, 2014.

* cited by examiner

| $H \times W \times C$ | Conv blocks |
|---|---|
| $32 \times 32 \times 3$ | Input |
| $32 \times 32 \times 16$ | Conv-BN-ReLU |
| Stage 1 | Concatenate |
| $32 \times 32 \times 16k_w$ | $[T_{warp}^{(K)}] \times N_{warp}$ |
| Stage 2 | Avg_pool(2x2)-Concatenate |
| $16 \times 16 \times 32k_w$ | $[T_{warp}^{(K)}] \times N_{warp}$ |
| Stage 3 | Avg_pool(2x2)-Concatenate |
| $8 \times 8 \times 64k_w$ | $[T_{warp}^{(K)}] \times N_{warp}$ |
| $1 \times 1 \times 64k_w$ | BN-ReLU-Average Pooling(8,8) |
| | Fully Connected(# of classes) |

FIG. 5

| CIFAR-10, $N_{warp}=3$ | GPU assignment | $k_w=4$ | $k_w=6$ |
| --- | --- | --- | --- |
| WarpNet1-37-$k_w$ | [$F_1,F_2$],[$F'_2,x_1$] | 5.18 (33%) | 4.79 (36%) |
| WarpNet2-37-$k_w$ | [$F_1,F_2$],[$F'_2,F_1$] | 5.15 (23%) | 4.92 (26%) |
| WRN-37-$k_w$ | [$F_1,F_2$] | 4.97 (0%) | 5.01 (0%) |

| CIFAR-10, $N_{warp}=6$ | GPU assignment | $k_w=4$ | $k_w=6$ |
| --- | --- | --- | --- |
| WarpNet1-73-$k_w$ | [$F_1,F_2$],[$F'_2,x_1$] | 4.51 (34%) | 4.76 (36%) |
| WarpNet2-73-$k_w$ | [$F_1,F_2$],[$F'_2,F_1$] | 4.86 (24%) | 4.91 (26%) |
| WRN-73-$k_w$ | [$F_1,F_2$] | 4.80 (0%) | 4.71 (0%) |

| CIFAR-100, $N_{warp}=3$ | GPU assignment | $k_w=4$ | $k_w=6$ |
| --- | --- | --- | --- |
| WarpNet1-37-$k_w$ | [$F_1,F_2$],[$F'_2,x_1$] | 22.4 (33%) | 21.6 (36%) |
| WarpNet2-37-$k_w$ | [$F_1,F_2$],[$F'_2,F_1$] | 22.8 (23%) | 22.0 (26%) |
| WRN-37-$k_w$ | [$F_1,F_2$] | 22.8 (0%) | 21.6 (0%) |

| CIFAR-100, $N_{warp}=6$ | GPU assignment | $k_w=4$ | $k_w=6$ |
| --- | --- | --- | --- |
| WarpNet1-73-$k_w$ | [$F_1,F_2$],[$F'_2,x_1$] | 21.4 (34%) | 21.1 (36%) |
| WarpNet2-73-$k_w$ | [$F_1,F_2$],[$F'_2,F_1$] | 21.7 (24%) | 21.4 (26%) |
| WRN-73-$k_w$ | [$F_1,F_2$] | 21.8 (0%) | 21.9 (0%) |

FIG. 6

| CIFAR-10, $N_{warp} = 2$ | GPU assignment | $k_w = 4$ | $k_w = 6$ |
|---|---|---|---|
| WarpNet1-37-$k_w$ | [F$_1$, F$_2$], [F$_3$], [F'$_2$x$_1$, F'$_3$x$_1$] | 5.39 (43%) | 5.35 (47%) |
| WarpNet2-37-$k_w$ | [F$_1$, F$_2$], [F$_3$], [F'$_2$F$_1$, F'$_3$F$_1$, F'$_3$F$_2$] | 5.52 (34%) | 5.22 (33%) |
| WRN-37-$k_w$ | [F$_1$, F$_2$, F$_3$] | 4.97 (0%) | 5.01 (0%) |

| CIFAR-10, $N_{warp} = 4$ | GPU assignment | $k_w = 4$ | $k_w = 6$ |
|---|---|---|---|
| WarpNet1-73-$k_w$ | [F$_1$, F$_2$], [F$_3$], [F'$_2$x$_1$, F'$_3$x$_1$] | 4.66 (45%) | 4.64 (46%) |
| WarpNet2-73-$k_w$ | [F$_1$, F$_2$], [F$_3$], [F'$_2$F$_1$, F'$_3$F$_1$, F'$_3$F$_2$] | 4.81 (34%) | 4.77 (34%) |
| WRN-73-$k_w$ | [F$_1$, F$_2$, F$_3$] | 4.80 (0%) | 4.71 (0%) |

| CIFAR-100, $N_{warp} = 2$ | GPU assignment | $k_w = 4$ | $k_w = 6$ |
|---|---|---|---|
| WarpNet1-37-$k_w$ | [F$_1$, F$_2$], [F$_3$], [F'$_2$x$_1$, F'$_3$x$_1$] | 22.8 (43%) | 22.2 (47%) |
| WarpNet2-37-$k_w$ | [F$_1$, F$_2$], [F$_3$], [F'$_2$F$_1$, F'$_3$F$_1$, F'$_3$F$_2$] | 23.0 (34%) | 23.1 (33%) |
| WRN-37-$k_w$ | [F$_1$, F$_2$, F$_3$] | 22.8 (0%) | 21.6 (0%) |

| CIFAR-100, $N_{warp} = 4$ | GPU assignment | $k_w = 4$ | $k_w = 6$ |
|---|---|---|---|
| WarpNet1-73-$k_w$ | [F$_1$, F$_2$], [F$_3$], [F'$_2$x$_1$, F'$_3$x$_1$] | 22.0 (45%) | 21.4 (46%) |
| WarpNet2-73-$k_w$ | [F$_1$, F$_2$], [F$_3$], [F'$_2$F$_1$, F'$_3$F$_1$, F'$_3$F$_2$] | 21.9 (34%) | 21.2 (35%) |
| WRN-73-$k_w$ | [F$_1$, F$_2$, F$_3$] | 21.8 (0%) | 21.9 (0%) |

| | # of parameters | ImageNet32 × 32 |
|---|---|---|
| WRN-73-2 | 4.8M | 23.0 (0%) |
| WarpNet1-73-2 ($K = 2, N_{warp} = 6$) | 4.8M | 23.0 (27%) |
| WarpNet1-73-2 ($K = 3, N_{warp} = 4$) | 4.8M | 23.5 (41%) |
| WarpNet1-100-2 ($K = 3, N_{warp} = 6$) | 7.1M | 22.1 (12%) |
| WarpNet1-73-4 ($K = 2, N_{warp} = 6$) | 18.9M | 19.5 |
| WRN-28-10 (Chrabaszcz & Hutter, 2017) | 37.1M | 18.9 |

PARALLEL RESIDUAL NEURAL NETWORK ARCHITECTURE AND SYSTEM AND METHOD FOR TRAINING A RESIDUAL NEURAL NETWORK

TECHNICAL FIELD

The following relates generally to artificial neural networks and more specifically to training a residual neural network.

BACKGROUND

Deep Convolution Neural Networks (CNN) have been used in image recognition tasks with great success. Some conventional approaches include AlexNet, VGG, Inception, and Residual Networks (ResNet).

Training a deep neural network is not an easy task. As the gradient at each layer is dependent upon those in higher layers multiplicatively, the gradients in earlier layers can vanish or explode, ceasing the training process. The gradient vanishing problem is significant for neuron activation functions such as the sigmoid, where the gradient approaches zero exponentially away from the origin on both sides. The standard approach to combat vanishing gradient is to apply Batch Normalization (BN) followed by the Rectified Linear Unit (ReLU) activation. More recently, skip connections have been proposed to allow previous layers to propagate relatively unchanged. Using this approach, it may be possible to train extremely deep networks of hundreds of layers; for example, ResNets have been trained with about one thousand layers.

As the number of layers grows large, so does the training time. In operation of a neural network in a data processing task, to evaluate the neural network's output, one needs to propagate the input of the network layer by layer in a procedure known as forward propagation. Similarly, during training of the neural network, one needs to propagate the gradient of the loss function from the end of the network to update the model parameters, or weights, in each layer of the network using gradient descent. The complexity of forward and backward propagation is O(K), where K is the number of layers in the network. There is a need to speed up the training process in deep neural networks.

SUMMARY

In an aspect, there is provided a method for training a residual neural network executed on one or more processing units, the residual neural network comprising a plurality of warp units connected in series, each warp unit comprising an input, an output, a plurality of independent residual units connected in parallel from the input to the output, a direct connection from the input to the output, and at least one derivative unit connected from the input to the output in parallel to the residual units, each residual unit comprising one or more weights, the method comprising: initializing the one or more weights of each residual unit; inputting a plurality of training cases to the first warp unit in the series; using each training case to optimize the one or more weights for each residual unit in parallel in the first warp unit in the series; starting with the output of the first warp unit in the series, iteratively propagating the output of each warp unit to the input of the next respective warp unit in the series, for each respective warp unit, using each training case to optimize the one or more weights for each residual unit in parallel in the respective warp unit; and storing the output of the last warp unit in the series and the weights for each residual unit.

In a particular case, the at least one derivative unit is determined using at least one multiplication of one of the residual units to a derivative of another one of the residual units.

In another case, the at least one derivative unit is determined as a derivative of at least one of the residual units.

In yet another case, the at least one derivative unit is determined as a derivative of at least one of the residual units multiplied by the input.

In yet another case, the output is determined from the input using first-order Taylor Series Expansion of the residual units and the at least one derivative unit.

In yet another case, the method further comprising performing back propagation comprising propagating a weight gradient of a loss function from the last warp unit in the series to the first warp unit, in each warp unit, the one or more weights of each residual unit are independently updated in parallel.

In yet another case, the weight gradient for each warp unit is determined as a gradient of the output of the warp unit multiplied by a sum comprising the gradients of the residual units and gradients of the at least one derivative unit.

In yet another case, the gradient of each of the at least one derivative units comprising at least one multiplication of the gradient of one of the residual units to the gradient of another one of the residual units.

In yet another case, the sum further comprises the identity matrix.

In yet another case, at least two of the warp units comprising a differing quantity of residual units from each other.

In another aspect, there is provided a system for training a residual neural network, the system comprising one or more processors and one or more non-transitory computer storage media, the one or more non-transitory computer storage media causing the one or more processors to execute the residual neural network comprising: a plurality of warp units comprising an input and an output and a direct connection from the input to the output; for each of the warp units, a plurality of residual units connected in parallel, each residual unit comprising one or more weights; for each of the warp units, at least one derivative unit connected in parallel to the residual units; and a warp operator to receive the inputs and outputs from each of the warp units and to train the residual neural network, the training comprising optimizing the weights of each residual unit based on a plurality of training cases.

In a particular case, the weights for each residual unit in a warp unit is determined on a separate processing unit.

In another case, training of the residual neural network comprising; initializing the one or more weights of each residual unit; inputting a plurality of training cases to the first warp unit in the series; using each training case to optimize the one or more weights for each residual unit in parallel in the first warp unit in the series; starting with the output of the first warp unit in the series, iteratively propagating the output of each warp unit to the input of the next respective warp unit in the series, for each respective warp unit, using each training case to optimize the one or more weights for each residual unit in parallel in the respective warp unit; and storing the output of the last warp unit in the series and the weights for each residual unit in the one or more non-transitory computer storage media.

In yet another case, the at least one derivative unit is determined using at least one multiplication of one of the residual units to a derivative of another one of the residual units.

In yet another case, the at least one derivative unit is determined as a derivative of at least one of the residual units.

In yet another case, the at least one derivative unit is determined as a derivative of at least one of the residual units multiplied by the input.

In yet another case, the output is determined from the input using first-order Taylor Series Expansion of the residual units and the at least one derivative unit.

In yet another case, the warp operator further performing, with the warp units, back propagation, the back propagation comprising propagating a weight gradient of a loss function from the last warp unit in the series to the first warp unit, in each warp unit, the one or more weights of each residual unit are independently updated in parallel.

In yet another case, the weight gradient for each warp unit is determined as a gradient of the output of the warp unit multiplied by a sum comprising the gradients of the residual units and gradients of the at least one derivative unit.

In yet another case, the gradient of each of the at least one derivative units comprising at least one multiplication of the gradient of one of the residual units to the gradient of another one of the residual units.

These and other aspects are contemplated and described herein. It will be appreciated that the foregoing summary sets out representative aspects of a system and method for training a residual neural network and assists skilled readers in understanding the following detailed description.

DESCRIPTION OF THE DRAWINGS

A greater understanding of the embodiments will be had with reference to the Figures, in which.

DETAILED DESCRIPTION

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

To speed up the training process for a deep neural network, it may be advantageous to have a shallower network that accurately approximates the deep network. Applicant has found that residual neural network (ResNet) architectures permit such an approximation. However, Applicant has further established a faster approach to training K layer ResNets in O(1) time as opposed to O(K) time with forward and backward propagation.

In one aspect, an artificial neural network architecture is provided for training a ResNet. In another aspect, a system and method for training a ResNet are provided. The system may comprise a parallelizable warp operator for training the ResNet by restructuring residual units of the ResNet using a first-order Taylor series approximation.

The following can be used to significantly reduce the training times for a ResNet. This speedup in training may be achieved by decoupling the ResNet into individual residual units, or layers, and training them in parallel using the parallelizable warp operator. The number of parallelizable computations grows exponentially with the number of ResNet layers skipped; therefore, it is a significant improvement that most, or even all, of the ResNet layers can be trained in the time of just a few.

Figure 1:
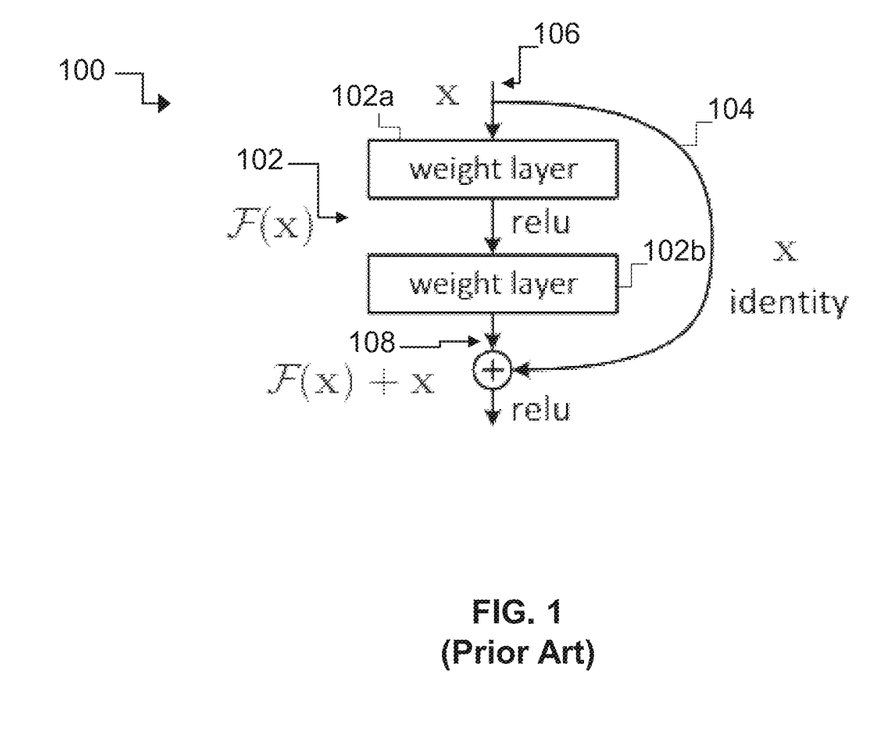
FIG. 1 is an architecture diagram of a residual unit in a conventional residual neural network.

Referring now to FIG. 1, a single residual unit 100 in a conventional ResNet is shown. The residual unit 100 is composed of a stack of weight layers 102 and a shortcut connection 104. The number of weight layers 102 can vary, e.g. FIG. 1 shows two weight layers 102a, 102b but there may be more; single-layer residual units are uncommon, however, due to a lack of advantages. The weight layers 102 can also vary in size and type, e.g. they may be fully-connected layers or convolutional layers.

Shortcut connection 104 skips one or more weight layers 102. The purpose of shortcut connections is to perform an identity mapping, such that the shortcut connection 104 maps an input 106 that is given to the residual unit 100 to be added to an output 108 of a final layer 102b of the weight layers 102. A person of skill will readily understand operation of a residual unit of a conventional ResNet as shown.

Figure 2:
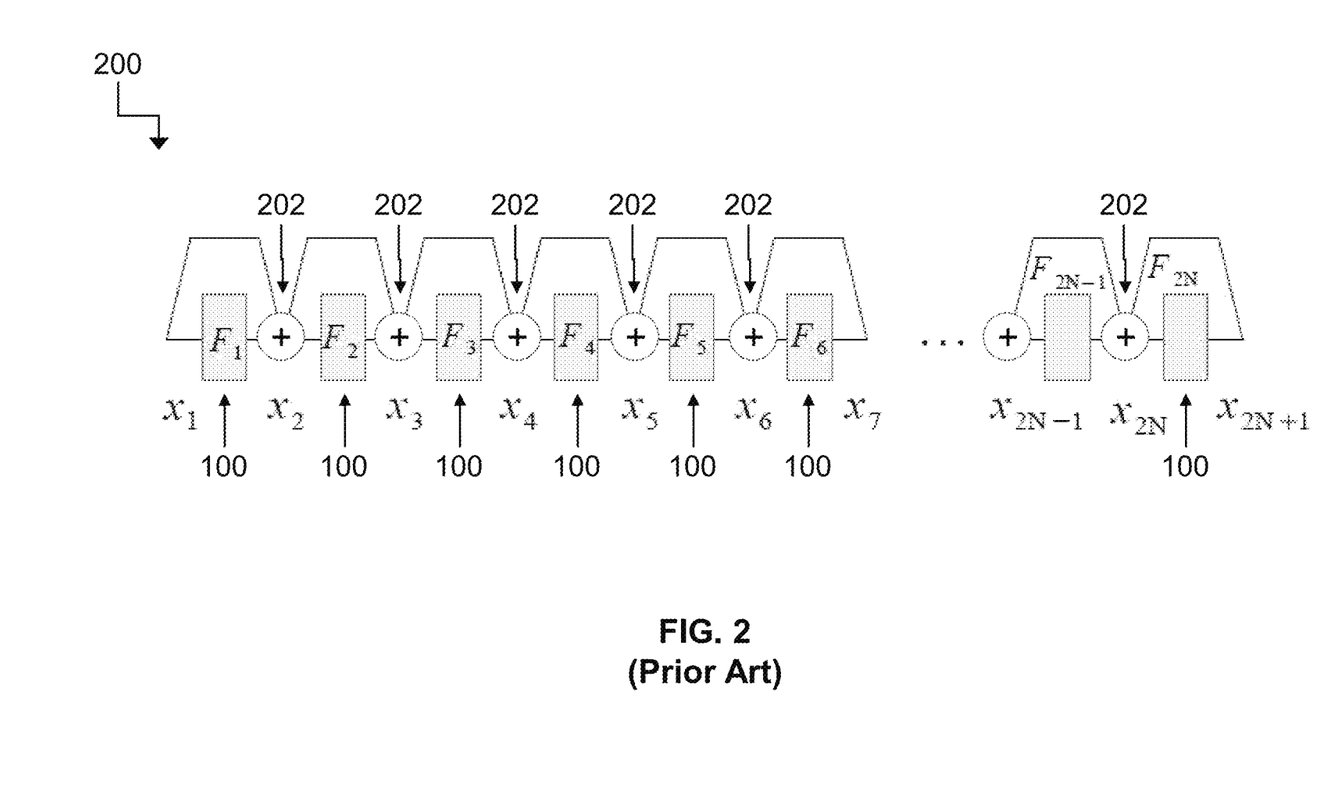
FIG. 2 is a block diagram of a conventional residual neural network.

FIG. 2 illustrates a conventional ResNet 200, which typically consists of a long chain of residual units 100, each generally having the structure shown in FIG. 1, connected in sequence by connections 202. Previous studies suggest that ResNets behave as an ensemble of shallow networks and that randomly deactivating residual units during training (similar to the drop-out technique) appears to improve performance. Applicant has found based on these observations that the output of a residual unit can be considered as a small perturbation of the input.

ResNets appear to exhibit an iterative estimation behavior as opposed to representation learning. Within one ResNet stage (FIG. 2 illustrates a single stage, where a stage is a chain of residual units having outputs of the same dimension), which has shortcut connections in all but the first residual units, the feature map representation appears to steadily converge to one that minimizes the loss function at the end of the stage. ResNets appear to perform representation learning in the first few layers and iterative estimation in the rest within the same stage.

ResNets may be explained by applying the perturbation theory. Consider the input $x_i$ of the i-th residual unit of the ResNet 200 and its output $x_{i+1}$, where $$x_{i+1} = h(x_i) + F_i(x_i, W_i) \qquad (1)$$

Typically, $h(x_i)$ is taken to be an identity mapping, $h_i(x_i) = x_i$, which represents the shortcut connection. When the feature maps are down sampled, h may be a 1×1 convolution layer with a stride of 2. The function $F_i$ may a combination of convolution, normalization and non-linearity layers, so that $W_i$ collectively represents the weights of all layers in Applicant has determined that the interpretation of ResNets as an ensemble of subnetworks is accurate up to the first order in F with identity mapping. The identity mapping causes F to be small compared to the input x so one can approximate the output of a chain of residual units by a series expansion. For instance, the output of two residual units $x_3$ is related to the input of the first unit. When $x_k$ is expressed in terms of $x_{k+1}$, which is referred to as an iteration. The following equations show two iterations.

$$x_3 = x_2 + F_2(x_2, W^*_2)$$

$$x_3 = x_1 + F_1(x_1, W^*_1) + F_2(x_1, W^*_2) + F'_2(x_1, W^*_2)F_1(x_1, W^*_1) + O(\epsilon^2) \qquad (2)$$

where $F'_2(x_1, W^*_2)$ denotes the partial derivative of $F_2$ with respect to $x_1$. A Taylor series expansion in powers of $F_1$ was performed on $F_2$ in the second line above. The Taylor expansion for multivariate functions is $f(x+a) = x + a\nabla_x f(x) + O(\epsilon^2)$. The first-order Taylor series expansion is almost exact when ReLU activations are used. Equation (2) can be interpreted as an ensemble sum of subnetworks. Although equation (2) relates to the expansion for two iterations, additional iterations could be applied for additional residual units.

Extending equation (2) to apply across K residual units:

$$x_{K+1} = x_1 + \Sigma_{\sigma_c \in P(S_K) \setminus \{\varnothing\}} [\Pi_{i=2}^{K} F'_{c(i)}(x_1, W^*_{c(i)})] F_{c(1)}(x_1, W^*_{c(1)}) + O(\epsilon^2), \qquad (3)$$

where $S_K = \{1, 2, \ldots, K\}$, $\sigma_c$ any subset of the power set $P(S_K)$ and the last term arises from higher order terms from the Taylor expansion. The indices c are ordered such that $c(i) > c(i-1) > \ldots > c(1)$. For a fixed cardinality $|\sigma_c| = k$, there are $$\binom{K}{k}$$

terms, where $$\binom{K}{k}$$

is the corresponding binomial coefficient. The binomial nature of subnetworks is evident from this formulation.

In Equation (3), the sum over all subsets of $S_K$, $\sigma_c$, can be rewritten as a sum over the cardinality k. Each k has a binomial number of terms $$\binom{K}{k}.$$

The binomial nature of subnetworks is evident from this formulation. For each k, there are k factors of F in the sum. Thus k can be interpreted as the subnetwork depth.

It may be observed that the gradient in a ResNet is the sum from all subnetwork contributions, including the identity network. Skilled persons are familiar with suitable magnitudes of subnetwork gradients for an 110-layer ResNet. If one takes F to have ReLU non-linearity. Then $F''(x) = 0$. The non-trivial gradient can be expressed as just a product of F and $(F')^{k-1}$. Thus, it can be seen that the gradient norm decreases exponentially with subnetwork depth k.

Applicant has further determined that the first order perturbations are sufficient for approximating the ResNet and that higher order perturbations can be discarded. For ReLU non-linearity, the second-order perturbations vanish almost exactly. The second-order perturbation terms all contain the Hessian $F''(x) = 0$. However, after the network is trained, the only non-linear function in F, ReLU, is non-linear only at the origin; batch normalization layers are non-linear during training, due to the scaling by the sample variance. Therefore, all second-order perturbations vanish with almost exactly. The same argument applies to higher orders.

Figure 3:
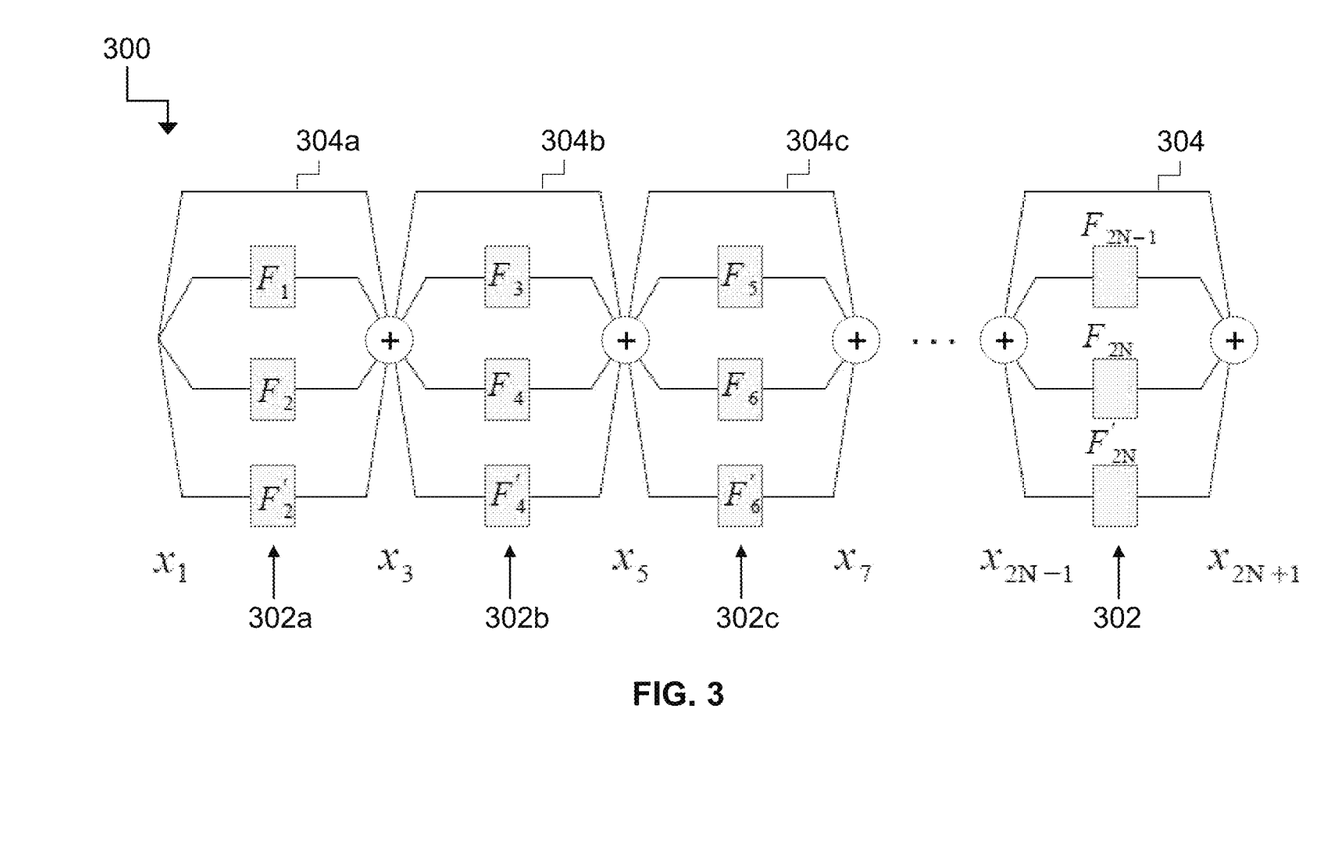
FIG. 3 is a block diagram of an embodiment of a system for training a residual neural network.

FIG. 3 illustrates the presently disclosed warped residual neural network (also referred to herein as WarpNet). The WarpNet 300 comprises a plurality of warp units 304 linked in series, each warp unit 304 comprising a non-overlapping subset of the plurality of ordered residual units 302 which have been decoupled, such that the connections 202 between residual units 100 in FIG. 1 have been broken or removed. The residual units of any particular warp unit 304 are ordered, that is sequential, in the ResNet. Further, the residual units 302 are connected in parallel within each warp unit and each residual unit is independent of other residual units. A link from the input to the output of the warp unit 304, and at least one F', each a derivative unit computed based on the residual unit F, are also connected in parallel with the residual units 302. The included derivative units are determined based on a Taylor Series expansion to compute the output from the input.

The input to the warp unit 304 is selected from the first input among the included residual units 302, and the output to the warp unit 304 is selected from the last output among the included residual units 302. For example, in FIG. 2, a first residual unit $F_1$ accepts input $x_1$ and produces output $x_2=x_1+F_1$ and a second residual unit $F_2$ accepts input $x_2$ (which was the output of the first unit) and produces output $x_3=x_2+F_2$. By contrast, in the WarpNet 300, a first warp unit 304a, comprising residual units 302a consisting of $F_1$ and $F_2$ accepts input $x_1$ and directly produces output $x_3$, bypassing $x_2$ altogether. Skilled persons will appreciate the processing savings of such an approach.

More specifically, in FIG. 3, warp unit 302a comprises residual units $F_1$, $F_2$, derivative unit $F'_2$, and a link from the input $x_1$ to the output $x_3$, connected in parallel. The output of the warp unit 304 is the summation of the outputs of the included residual units, derivative units and the input to the warp unit 304. It is contemplated that a particular warp unit could comprise additional residual units, as described below, for bypassing additional points in the ResNet. If there are additional residual units, then there may be additional derivative units as well.

In FIG. 3, additional warp units 304 are shown for various parallel sets of residual units 302. It is contemplated that a particular WarpNet need not have uniformity amongst warp units 304; namely, it is possible in specific implementations for one particular warp unit to comprise a particular number of residual units, and another warp unit to comprise a different number of residual units.

Figure 4:
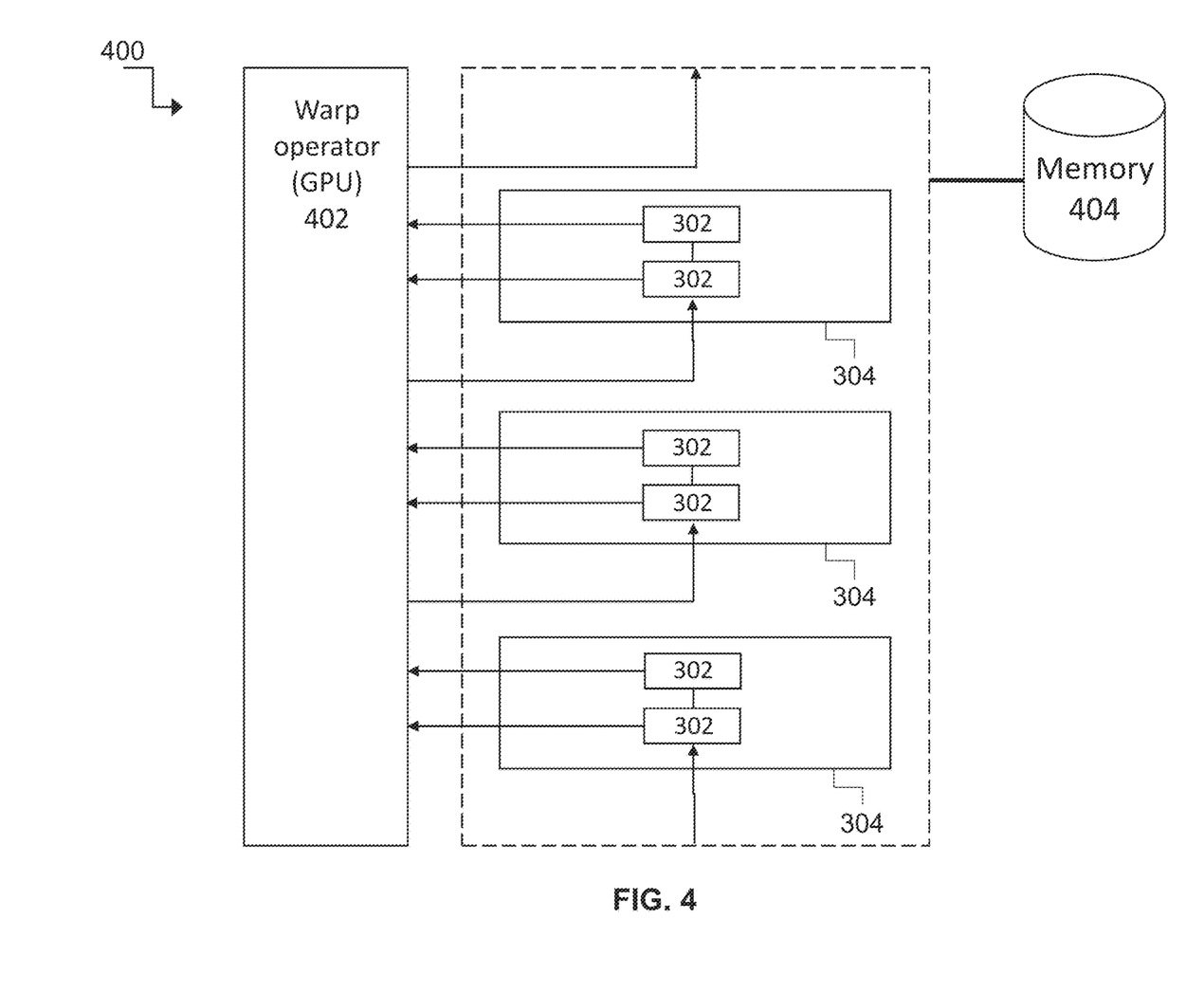
FIG. 4 is a further embodiment of a system for training a residual neural network.

The computation in the warp unit 304 is different from that in the conventional ResNet 200. As illustrated in FIG. 4, a system 400 is provided for training a ResNet using a warp operator 402 to compute the output (i.e., $x_{K+1}$) of the warp unit 304 directly from the input (i.e., $x_1$), as shown in Equation (3). The number of weights in the warp unit 304 is the same as the one in the original ResNet 200 for K consecutive residual units. For instance, the weights $W_1$, $W_2$ and $W_K$ may be present in the warp unit 304. However, these weights can be used and updated in parallel due to the use of the warp operator 402. Also note that, in FIG. 3, $F_2$ shares the same weights with $F'_2$, as they come from the same residual unit in the original ResNet 200.

The warp operator 402 may be first applied for forward propagation. A modified forward propagation rule for the WarpNet 300 can be described using warp operator 402, $T_{warp}^K$, which may, for example, be implemented by a graphics processing unit (GPU). The expression for $T_{warp}^K$ is derived from Equation (3) by dropping the negligible $O(\in^2)$ term, that is, by using the Taylor series expansion to the first order:

$$x_{K+1} = x_1 + \sum_{\sigma_c \in P(S_k) \setminus \{\emptyset\}} \left[ \prod_{i=2}^{K} F'_{c(i)}(x_1, W^*_{c(i)}) \right] F_{c(1)}(x_1, W^*_{c(1)})$$

Note that $T_{warp}^K$ can be calculated in a parallelizable manner for all K. For example, where K=2, $$x_3 = x_1 + F_1(x_1, W_1) + F_2(x_1, W_2) + F'_2(x_1, W_2)F_1(x_1, W_1)$$

where $W_i$ corresponds to the weights in the i-th residual unit in the original ResNet 200.

The warp operator 402 may be applied for backpropagation as well. A modified backpropagation rule for the WarpNet 300 can also be described using the warp operator $T_{warp}^K$. If the upstream gradient $\partial L/\partial x_5$ is known and in order to compute $\partial L/\partial W_1$ for gradient descent, the gradient is first backpropagated down from $x_5$ to $x_3$. With $x_5=T_{warp}^K(x_3)$, the backpropagated gradient can be derived as:

$$\frac{\partial L}{\partial x_3} = \frac{\partial L}{\partial x_5}\left[I + \frac{\partial F_3(x_3, W_3)}{\partial x_3} + \frac{\partial F_4(x_3, W_4)}{\partial x_3} + \frac{\partial F_4(x_3, W_4)}{\partial x_3}\frac{\partial F_3(x_3, W_3)}{\partial x_3}\right]$$

where I is the identity matrix and the derivative of $F''_4$ is set to zero for ReLU non-linearities. Applicant has shown that the same kind of parallelism in the warp operator 402 is present for backpropagation as for forward propagation.

The weight gradient for updates can be evaluated as follows:

$$\frac{\partial L}{\partial W_1} = \frac{\partial L}{\partial x_3}\left[\frac{\partial F_1(x_1, W_1)}{\partial W_1} + \frac{\partial F_2(x_1, W_2)}{\partial x_1}\frac{\partial F_1(x_1, W_1)}{\partial W_1}\right]$$

The update rule is similar for $W_2$. Rules for the all other weights in the WarpNet 300 can be obtained in the same way, $$\frac{\partial L}{\partial W_2} = \frac{\partial L}{\partial x_3}\left[\frac{\partial F_2(x_1, W_2)}{\partial W_2} + \frac{\partial^2 F_2(x_1, W_2)}{\partial W_2 \partial x_1}F_1(x_1, W_1)\right]$$

The weights $W_1$ and $W_2$ can be updated in parallel independently. The derivatives $\partial F_2/\partial x_1$ in $\partial L/\partial W_1$ and other derivatives needed in $\partial L/\partial x_3$ are already computed in the forward pass which could be saved and reused, for example by storing it in memory 404. Furthermore, all derivatives needed in $\partial L/\partial x_3$ can also be computed in the forward pass.

In an aspect, as previously mentioned, the warp operator 402 may be implemented on one or more processing units such as CPUs or GPUs. In another aspect, the warp operator 402 may be part of another module, such as a learning module, that is responsible for training the WarpNet 300.

Memory 404 may be provided for storing activations and learned weights for each weight layer 102. The memory 404 may further store a training set comprising training data. The training data may, for example, be used for image classification in which case the training data may comprise images with known classifications. The memory 404 may further store a validation set comprising validation data.

During the training stage, the WarpNet 300 optimizes weights for each weight layer 102. After learning, the optimized weight configuration can then be applied to test data. Exemplary applications of such a neural network include image classification, machine translation, object recognition, speech recognition and genomic-oriented applications.

During the training stage, a plurality of training cases are presented to the WarpNet 300. In order to determine a final parameter setting for the parameters of the WarpNet 300, the warp operator 402 can be applied to each warp unit 304 to perform a computation of the output of the residual units 302 using just the input to the warp unit 304, as illustrated in FIG. 4. Each independent residual unit within the warp unit 304 is activated in parallel for the purpose of this computation. Advantageously, this produces comparable results to the original ResNet 200 while having a significant reduction in training time due to the parallelism.

Figure 5:
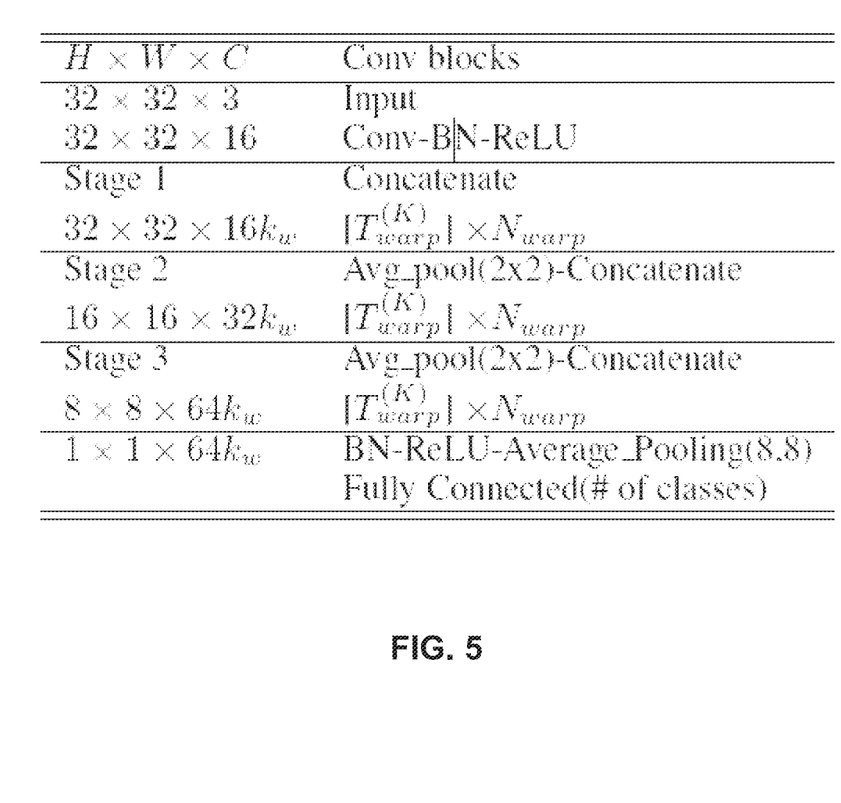
FIG. 5 is a table illustrating an exemplary structure of a system for training a residual neural network, in accordance with an embodiment of the presently disclosed system.

Referring now to FIG. 5, an exemplary structure of a system for training a ResNet is shown. In order to ensure the validity of the series expansion, the 1×1 convolution layers on shortcut connections may be replaced by an average pooling layer and a concatenate layer to reduce the spatial dimensions of feature maps and multiply their channels. In an aspect, a wide residual architecture may be adopted. The average pooling and concatenate layers may be used so that the identity mapping is preserved across dimensionality changing units. The convolution blocks may be comprised of the following layers, from input to output, BN-Conv-BN-ReLU-Conv-BN, as illustrated in FIG. 5. The layers $[T_{warp}^{(K)} \times N_{warp}]$ represent forward propagating $N_{warp}$ times, such that $x_{i+K} = T_{warp}^{(K)}(x_i, W_i, W_{i+1}, \ldots, W_{i+K-1})$ and the indices i correspond to the indices in the original ResNet 200.

Experimental results indicate that a computation bottleneck arises from the BN layers in $F'_2$. The reason being the gradient of BN layers contains an averaging operation that is expensive to compute. In an aspect, all BN layers in $F'_2$ may be removed from the system. This results in a departure from the series approximation but experimental results indicate that the network still trains well. This is because the normalizing layers are still being trained in $F_{1,2}$. To further improve the speedup, it may be beneficial to omit the $F_1$ block in the derivative term $F'_2 F_1$.

In experimentation conducted using Tensorflow, a network was implemented with parameters $k_w$, K and $N_{warp}$, where $k_w$ is the widening factor, and K is the warp factor. Tensorflow's automatic differentiation for backpropagation may be employed, where the gradients are calculated by sweeping through the network through the chain rule.

Figure 6:
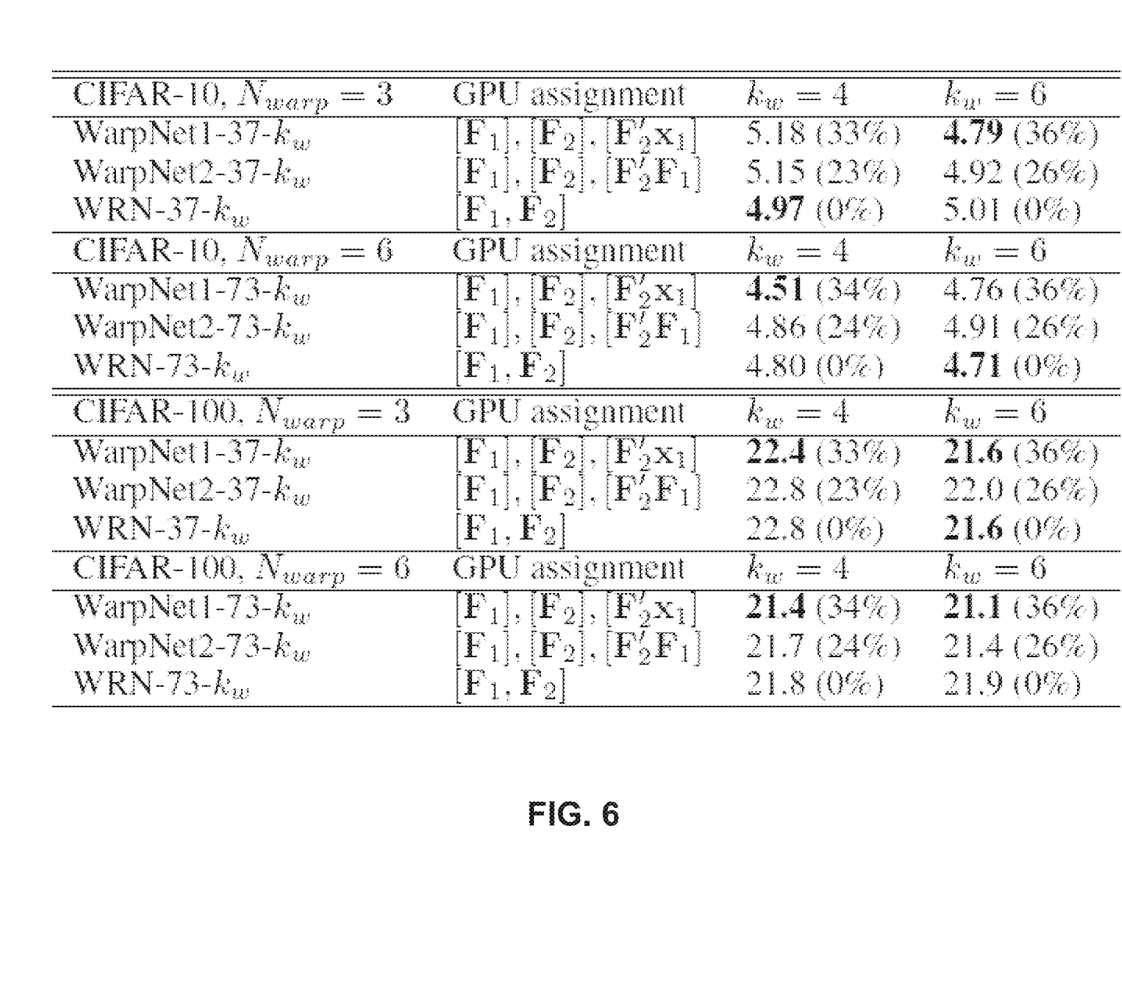
FIG. 6 and FIG. 7 are tables illustrating differences in test error percentages and improvement percentages in training speed between a conventional residual neural network and a residual neural network trained using an embodiment of the presently disclosed system on the CIFAR10 and CIFAR100 benchmark datasets.
Figure 7:
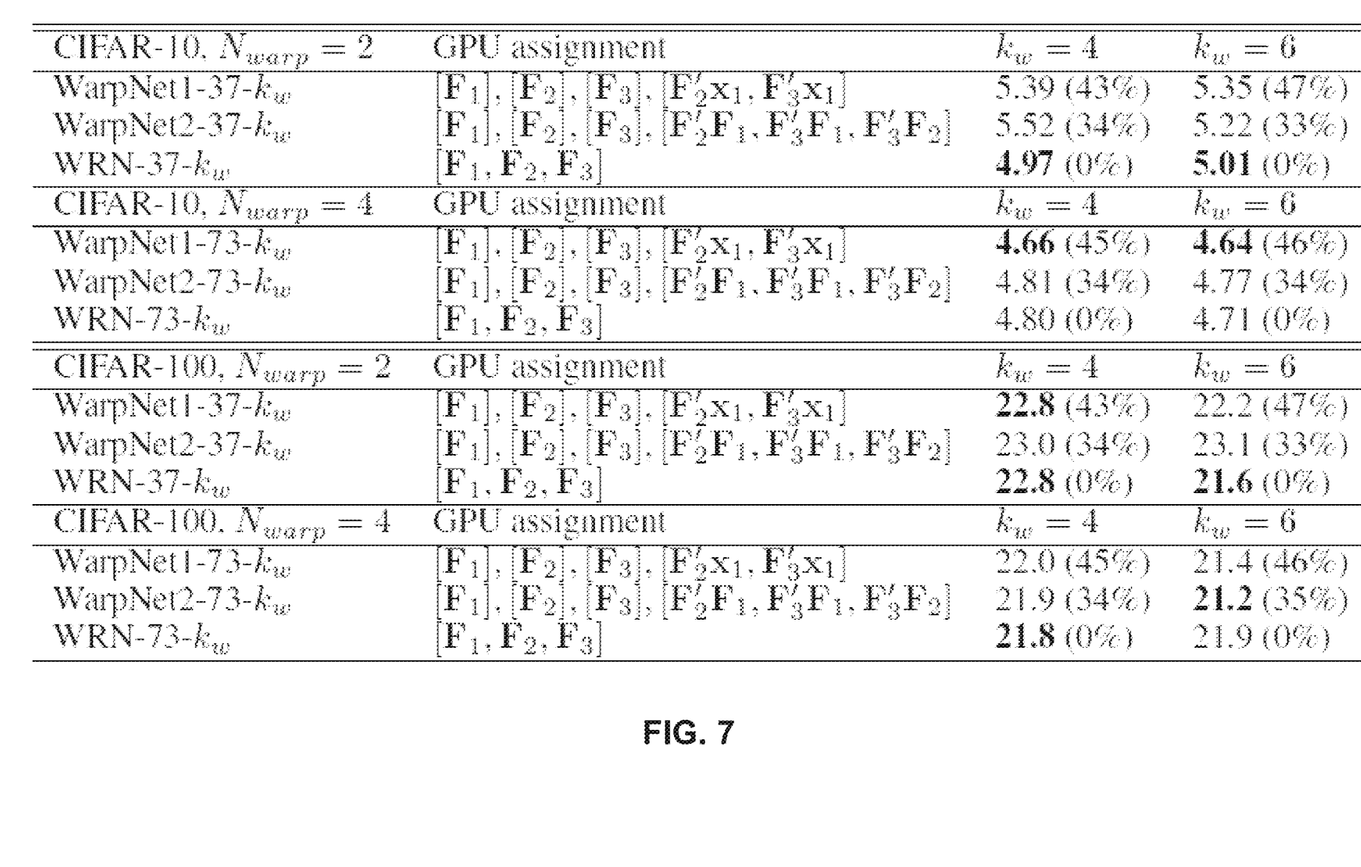

Referring now to FIG. 6 and FIG. 7, differences in test error percentages between a conventional residual neural network and a residual neural network trained using an embodiment of a system for training a residual neural network are shown. The corresponding relative speed-up with respect to residual neural network is shown in parentheses. FIG. 6 corresponds to K=2 and FIG. 7 corresponds to K=3. The conventional ResNet may have the same pooling and concatenate structure as the architecture shown in FIG. 5, but with each warp operator replaced by two residual units. Common data augmentation techniques, such as whitening, flipping and cropping may be used. Experiments may be performed for 80000 iterations, or 204 epochs; a training batch size of 128; and an initial learning rate is 0.1, which drops by a factor of 0.1 at epochs 60, 120, and 160, with a weight decay of 0.0005.

To exploit the parallelism of the WarpNet architecture and reduce the memory footprint at the same time, it may be advantageous to compute $F_1$ on one GPU, $F_2$ and $F'_2$ at the same time on another GPU because they share the same weights. Experimental results indicate significant speed up in both forward and backward propagation.

To further speed up WarpNet, the modification where $F_1$ is replaced by $x_1$ was used and experiments showed that this modification does not affect the predictive performance of WarpNet.

Experimental results suggest that the computation time is relatively constant with respect to the network depth. The speedup appears to scale with increasing widening factor $k_w$ and sizable with just a warp factor of K=2.

FIG. 6 and FIG. 7 shows the predictive accuracy of WarpNets and their speed-up in parentheses for K=2 and K=3, respectively. As illustrated in FIG. 6 and FIG. 7, a WarpNet may outperform a conventional ResNet in CIFAR-10 and CIFAR-100. FIG. 6 and FIG. 7 also illustrates exemplary relative speed-up of a WarpNet with respect to a conventional ResNet. The relative speed-up is defined as $(t_{res} - t_{warp})/t_{res}$, where $t_{res}$ is the time taken for ResNet to process a batch and $t^{warp}$ is the corresponding time for WarpNet.

The WarpNet shown in FIG. 3 is a good approximation of the ResNet of FIG. 2 and results in a significant savings in processing during training of the network.

Figure 9:
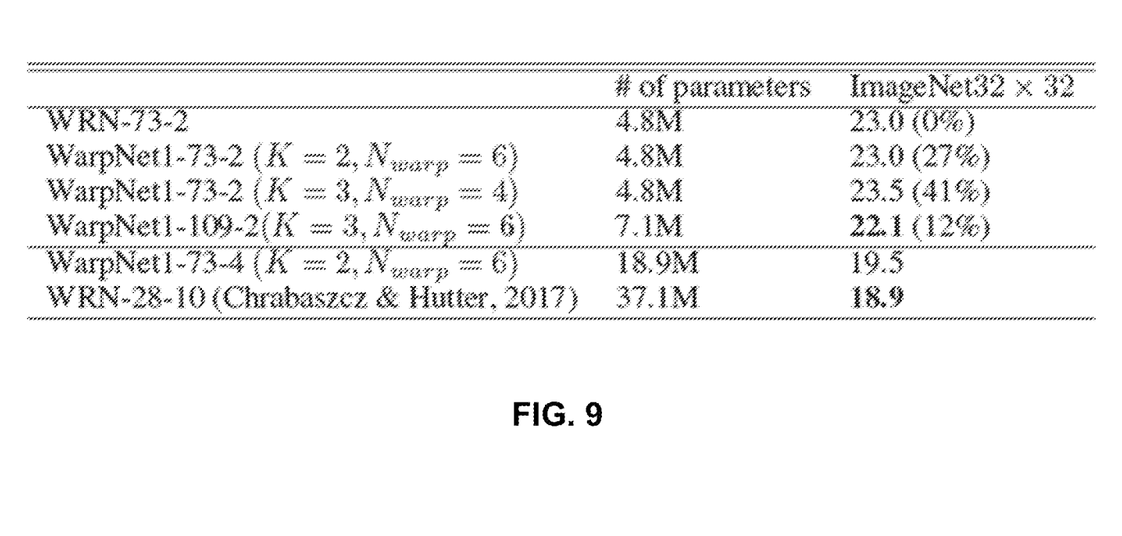
FIG. 9 is a table illustrating differences in validation error percentages between a conventional residual neural network and a residual neural network trained using an embodiment of the presently disclosed system on the ImageNet benchmark dataset.
Figure 10:
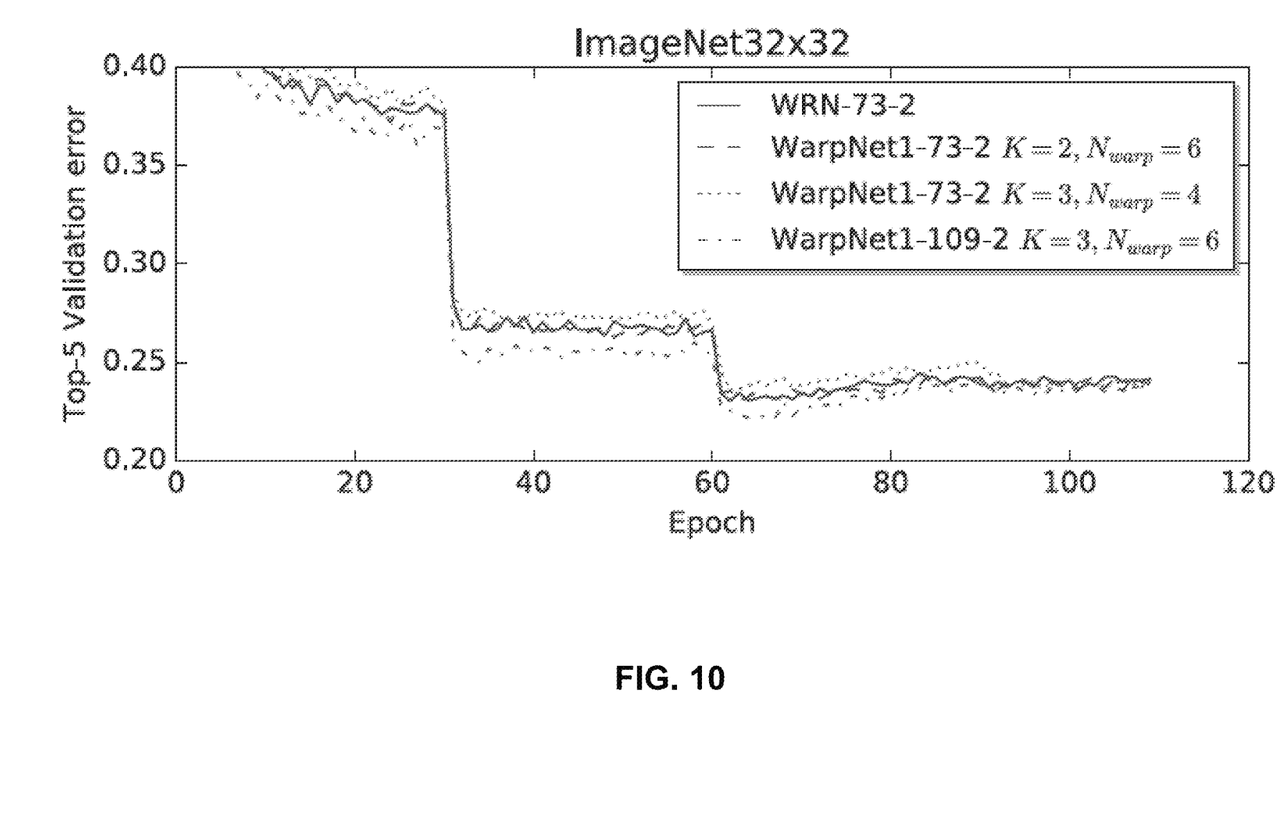
FIG. 10 is a chart illustrating differences in validation error between a conventional residual neural network and a residual neural network trained using an embodiment of the presently disclosed system on the ImageNet benchmark dataset.

Another example is shown in FIG. 9 with reference to a down-sampled (32×32) ImageNet data set. The data set contains 1000 classes with 1281167 training images and 50000 validation images with 50 images in each class. The training batch size is 512, initial learning rate is 0.4 and drops by a factor of 0.1 at every 30 epochs. The weight decay is set to be 0.0001. We use the overall best performing warp operator in the CIFAR experiments, namely, the one containing F'x. Exemplary results are shown in FIG. 9 and FIG. 10. It can be seen that for a given ResNet there is exists a WarpNet that obtains a higher validation accuracy with shorter training time. An increase in K from 2 to 3 with all other parameters fixed corresponds to WarpNet-109-2. The network has more residual units than WRN-73-2. It is observed that WarpNet-109-2 trains 12% faster than WRN-73-2 while resulting in a better validation accuracy. Second, WarpNet can achieve close to a benchmark validation error of 18.9% with WRN-28-10. It is notable that in the implementation used, it was not reasonable to train the corresponding WRN-73-4 on the dataset as the model requires too much memory on a single GPU. This shows that the weight distribution of WarpNet across GPUs allows a bigger network to be trained. Remarkably, the validation error curve for WRN-73-2 and its approximation WarpNet 73-2 (K=2; Nwarp=6) lie almost exactly on top of each other. This suggests that the utilized implementation of WarpNet is a good approximation of the corresponding WRN throughout training.

Figure 8:
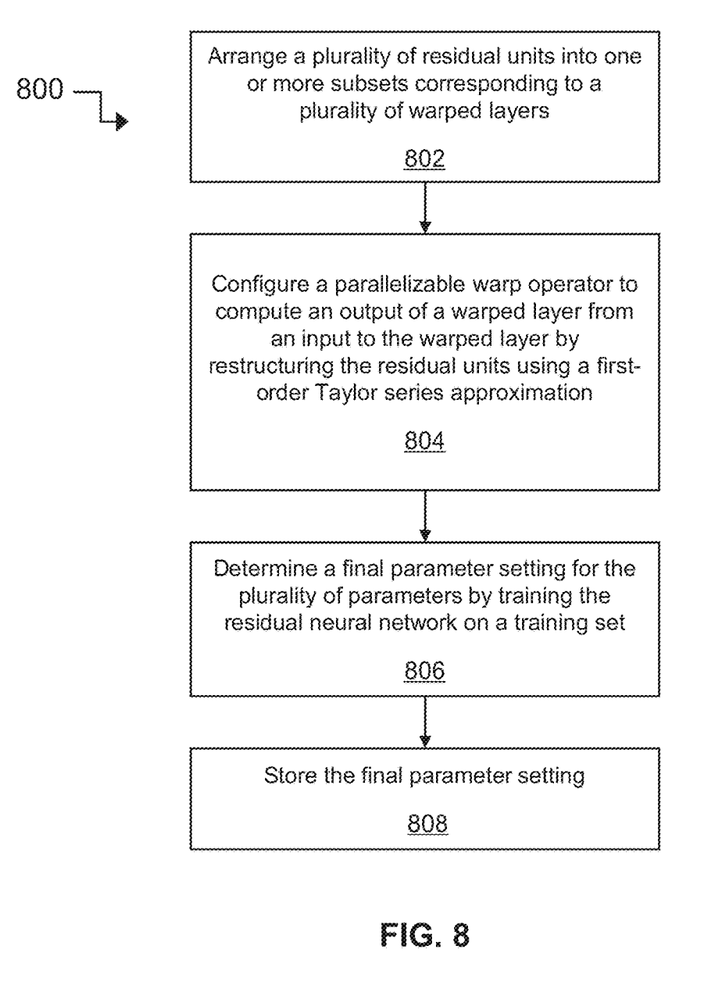
FIG. 8 is a flowchart illustrating a method for training a residual neural network, in accordance with an embodiment of the presently disclosed system.

FIG. 8 illustrates a method for training a conventional ResNet using a WarpNet. At block 802, a plurality of residual units 302 are arranged into one or more subsets corresponding to a plurality of warped units 304, wherein each residual unit 100 comprises a subset of the plurality of weight layers 102 and a shortcut connection 104 mapping an input 106 of the residual unit 100 to be added to an output 108 of a final layer 102b of the subset of the plurality of weight layers 102. The residual units 302 are decoupled from one another, such that each residual unit in a subset of the plurality of residual units is independent from other residual units.

At block 804, a warp operator 402 is configured to perform a computation of an output of a warped unit 304 from an input to the warped unit using a first-order Taylor series approximation. Each independent residual unit in the subset of the plurality of residual units is activated in parallel for the computation. In other words, the output of each residual unit in the warp unit is calculated in parallel, not in sequence as in a conventional ResNet, which greatly speeds up the computation.

At block 806, a final parameter setting for the plurality of parameters associated with the plurality of weight layers 102 is determined by training the residual neural network on a training set, wherein training the residual network comprises applying the warp operator 402 to each of the plurality of warped units 304. At block 808, the final parameter setting is stored on one or more non-transitory computer storage media, such as memory 404.

Although the invention has been described with reference to certain specific embodiments, various modifications thereof will be apparent to those skilled in the art without departing from the spirit and scope of the invention as outlined in the claims appended hereto.

We claim:

1. A method for training a residual neural network executed on one or more processing units, the residual neural network comprising a plurality of warp units connected in series, each warp unit comprising an input, an output, a plurality of independent residual units connected in parallel from the input to the output, a direct connection from the input to the output, and at least one derivative unit connected from the input to the output in parallel to the residual units, each residual unit comprising one or more weights, the method comprising:
   initializing the one or more weights of each residual unit;
   inputting a plurality of training cases to the first warp unit in the series;
   using each training case to optimize the one or more weights for each residual unit in parallel in the first warp unit in the series;
   starting with the output of the first warp unit in the series, iteratively propagating the output of each warp unit to the input of the next respective warp unit in the series, for each respective warp unit, using each training case to optimize the one or more weights for each residual unit in parallel in the respective warp unit; and
   storing the output of the last warp unit in the series and the weights for each residual unit.

2. The method of claim 1, wherein the at least one derivative unit is determined using at least one multiplication of one of the residual units to a derivative of another one of the residual units.

3. The method of claim 1, wherein the at least one derivative unit is determined as a derivative of at least one of the residual units.

4. The method of claim 1, wherein the at least one derivative unit is determined as a derivative of at least one of the residual units multiplied by the input.

5. The method of claim 1, wherein the output is determined from the input using first-order Taylor Series Expansion of the residual units and the at least one derivative unit.

6. The method of claim 1, further comprising performing back propagation comprising propagating a weight gradient of a loss function from the last warp unit in the series to the first warp unit, in each warp unit, the one or more weights of each residual unit are independently updated in parallel.

7. The method of claim 6, wherein the weight gradient for each warp unit is determined as a gradient of the output of the warp unit multiplied by a sum comprising the gradients of the residual units and gradients of the at least one derivative unit.

8. The method of claim 7, wherein the gradient of each of the at least one derivative units comprising at least one multiplication of the gradient of one of the residual units to the gradient of another one of the residual units.

9. The method of claim 8, wherein the sum further comprises the identity matrix.

10. The method of claim 1, wherein at least two of the warp units comprising a differing quantity of residual units from each other.

11. A system for training a residual neural network, the system comprising one or more processors and one or more non-transitory computer storage media, the one or more non-transitory computer storage media causing the one or more processors to execute the residual neural network comprising:
    a plurality of warp units comprising an input and an output and a direct connection from the input to the output;
    for each of the warp units, a plurality of residual units connected in parallel, each residual unit comprising one or more weights;
    for each of the warp units, at least one derivative unit connected in parallel to the residual units; and
    a warp operator to receive the inputs and outputs from each of the warp units and to train the residual neural network, the training comprising optimizing the weights of each residual unit based on a plurality of training cases.

12. The system of claim 11, wherein the weights for each residual unit in a warp unit is determined on a separate processing unit.

13. The system of claim 11, wherein the training of the residual neural network comprising;
    initializing the one or more weights of each residual unit;
    inputting a plurality of training cases to the first warp unit in the series;
    using each training case to optimize the one or more weights for each residual unit in parallel in the first warp unit in the series;
    starting with the output of the first warp unit in the series, iteratively propagating the output of each warp unit to the input of the next respective warp unit in the series, for each respective warp unit, using each training case to optimize the one or more weights for each residual unit in parallel in the respective warp unit; and
    storing the output of the last warp unit in the series and the weights for each residual unit in the one or more non-transitory computer storage media.

14. The system of claim 13, wherein the at least one derivative unit is determined using at least one multiplication of one of the residual units to a derivative of another one of the residual units.

15. The system of claim 13, wherein the at least one derivative unit is determined as a derivative of at least one of the residual units.

16. The system of claim 13, wherein the at least one derivative unit is determined as a derivative of at least one of the residual units multiplied by the input.

17. The system of claim 13, wherein the output is determined from the input using first-order Taylor Series Expansion of the residual units and the at least one derivative unit.

18. The system of claim 13, the warp operator further performing, with the warp units, back propagation, the back propagation comprising propagating a weight gradient of a loss function from the last warp unit in the series to the first warp unit, in each warp unit, the one or more weights of each residual unit are independently updated in parallel.

19. The system of claim 18, wherein the weight gradient for each warp unit is determined as a gradient of the output of the warp unit multiplied by a sum comprising the gradients of the residual units and gradients of the at least one derivative unit.

20. The system of claim 19, wherein the gradient of each of the at least one derivative units comprising at least one multiplication of the gradient of one of the residual units to the gradient of another one of the residual units.

* * * * *